United States Patent [19]
Dooley

[11] 3,734,798
[45] May 22, 1973

[54] HOT MELT PACKAGE COATING METHOD
[75] Inventor: Donald David Dooley, Lowell, Mass.
[73] Assignee: Borden Inc., New York, N.Y.
[22] Filed: Dec. 21, 1970
[21] Appl. No.: 100,200

Related U.S. Application Data
[62] Division of Ser. No. 837,877, June 30, 1969, abandoned.

[52] U.S. Cl.........156/308, 117/122 H, 117/155 UA, 156/334, 206/78 B, 260/897 A, 260/897 B
[51] Int. Cl................................................C09j 5/02
[58] Field of Search....................156/326, 327, 292, 156/334; 260/27 EV, 859 R, 897 B, 897 A, 28.5 AV; 117/155 UA, 158, 168, 161 UH, 161 UC, 122 H; 99/171 LP, 171 MP, 171 R; 206/78 B, DIG. 18; 161/246, 251, 250

[56] References Cited
UNITED STATES PATENTS

| | | |
|---|---|---|
| 3,202,277 | 8/1965 | Lewi .................................206/78 B |
| 3,402,223 | 9/1968 | Hollingsworth..................260/897 B |
| 3,463,753 | 8/1969 | Gonzenbach et al............260/27 EV |
| 3,600,347 | 8/1971 | Godar..........................260/897 B X |
| 3,626,026 | 12/1971 | Fukumura et al.............260/897 B X |
| 3,654,207 | 4/1972 | Arabian et al.................260/897 B X |

FOREIGN PATENTS OR APPLICATIONS

| | | |
|---|---|---|
| 977,740 | 12/1964 | Great Britain......................206/78 B |
| 1,092,161 | 11/1967 | Great Britain ...................260/27 EV |

OTHER PUBLICATIONS

DuPont Technical Information, "Elvax 260 Vinyl Resin," pp. 1, 2 and 4, 11/64.
Rears, "Curtain–Coating Methods Apply Functional Coatings to Corrugated Boxes," 11/64, Package Eng., pp. 1–7.

Primary Examiner—George F. Lesmes
Assistant Examiner—James J. Bell
Attorney—George P. Maskas

[57] ABSTRACT

This invention relates to a new method for preparing blister-pack and skin-pack cards and packages which comprises coating the card with, and fastening the blister or skin to the card with, a universal hot-melt adhesive, particularly one as hereinafter described which contributes a high specular gloss to the printed package.

7 Claims, No Drawings

3,734,798

HOT MELT PACKAGE COATING METHOD

This application is a divisional application of Ser. No. 837,877, filed June 30, 1969, now abandoned.

BACKGROUND OF THE INVENTION

Blister-packs and skin-packs, herein called "plasti-packs," have become a major packaging form because of their success in self-service retailing. Blister-packs comprise a product sealed between a transparent premolded plastic dome (the blister) and a card printed with matter relating to the product. Skin-packs are similar, but are formed by using the product itself as a mold and drawing a heat-softened plastic sheet (the skin) around the product while simultaneously heat-sealing said skin to the card. In the present discussion and claims, the term "plasti-packs" shall be understood to be a generic designation to include both blister-packs and skin-packs.

At present, plasti-pack cards are prepared by coating the printed paperboard or other relatively rigid substrate with an adhesive specifically "tailor made" for combination with the particular plastic to be used as blister or skin. Said adhesive is applied either as a lacquer solution in an organic solvent or as an aqueous dispersion such as an emulsion. In either case the solvent or water must be removed by drying in order to leave a dry coat of adhesive. In subsequent packaging, the blister or skin is fastened to the substrate by heat sealing, the adhesive being reactivated at places where heat is applied.

It is widely accepted in the trade that no single adhesive can be expected to have universal applicability in sealing to all the plastics commonly used as blister or skin. The most recent edition of "Facts About Blister Packaging," a brochure published by the Jackmeyer Corporation, states on page 16 that "An acetate blister, for example, requires one type of coating adhesive entirely different from that to be used with polystyrene." Whereas adhesive coatings to be used with cellulosic blisters or skins as cellophane, cellulose acetate, cellulose acetate propionate and cellulose acetate butyrate frequently comprise nitrocellulose-based lacquers, formulations intended for bonding polystyrene and polyvinyl chloride respectively to paperboard conventionally comprise materials such as polyvinyl acetate or polyvinyl chloride. These circumstances are the source of much inconvenience at packaging plants inasmuch as inventory of several types of stock are required. Also considerable economic losses are entailed because of the "downtime" required for switching the packaging equipment from one type of plasti-packs to another.

In order to serve best at self-selling, a plasti-pack package should also be attractive and for such purpose it is often demanded that plasti-pack adhesives should provide a high gloss on the printed board, especially in the places where the blister or skin will not contact the board and itself contribute to gloss. Attempts to obtain such gloss, even with solvent-based lacquers, have been only partially satisfactory.

The use of solvent and emulsion systems has had all the usual disadvantages inherent in the need for removal of solvent or water, requiring long drying tunnels and in the case of organic solvents, recovery systems for purposes of economy and to avoid air pollution.

In short, the conventional methods for manufacturing plasti-pack cards have been encumbered at the coating stage by the drying requirements and the conventional methods for packaging with plasti-pack cards have been encumbered by lack of a coating universally applicable with all plasti-pack plastics and ordinarily yield products deficient in gloss.

SUMMARY OF THE INVENTION

A means has now been found for providing a high-gloss plasti-pack card coating which is universally sealable to any of the plastics commonly used as a blister or skin, said means also eliminating the aforementioned problems encountered with lacquers or emulsions.

The instant invention comprises applying to the substrate card a hot-melt coating comprising a homogeneous hot-melt mixture of (a) between about 25 and about 45 parts by weight of an ethylene-vinyl acetate copolymer having between about 25 and about 35 percent of vinyl acetate and having a melt index between about 1 and about 30, (b) between about 1 and about 10 parts of an ethylene-vinyl acetate copolymer having between about 35 and about 55 percent vinyl acetate and having a melt index between about 5 and about 65, and (c) between about 15 and about 35 parts of a tackifying resin selected from the group consisting of rosin derivatives and terpene urethanes and having a melting point between about 200° and about 240° F.

The invention also comprises the resultant blister-pack and skin-pack cards and packages and the novel hot-melt adhesives especially for making such products.

DETAILED DESCRIPTION OF THE INVENTION

The three critical ingredients comprised in the adhesive coating of this invention are (a) a copolymer of ethylene and vinyl acetate containing between about 25 percent and about 35 percent by weight vinyl acetate (b) a copolymer of ethylene and vinyl acetate having between about 35 percent and about 55 percent vinyl acetate and (c) a tackifying resin selected from the group consisting of rosin derivatives and terpene urethanes having a melting point between about 200° and 240° F. Components (a) and (b) may have a melt index respectively in the ranges 1–30 and 5–65. For best results the choice of melt index and the relative proportions may be modified to accommodate the means of application such as, for example, whether an extrusion coater, a roller coater or a curtain coater is used.

The following table shows the permissible proportions of the aforementioned ingredients and also the proportions recommended for commercial use. Proportions here and elsewhere herein are expressed in parts by weight and on the dry basis unless specifically stated to the contrary.

| Critical Ingredients | Parts by Weight Per 100 Parts Total Formulation | |
|---|---|---|
| | Permissible | Recommended |
| (a) | 25–45 | 32–38 |
| (b) | 1–10 | 3–6 |
| (c) | 15–35 | 20–26 |

In addition to the aforementioned critical components there may be added as a flow promoter about 15 to about 40 parts by weight of a paraffin wax of high melting range between about 145° and about 175° F., and as a lubricant wetting agent about 1 to about 10 parts of a very high melting wax (melting range 200° to 230° F.). It is also possible to use between about 1 to about 15 parts of a microcrystalline wax of medium melting range (150° to 190° F.). Other ancillary agents known in the art of hot melt formulation, including agents to assist wetting, slipping, light resistance and the like, may be added in minor amounts of about less than 0.5 percent.

The hot-melt composition of the instant invention is applicable as a coating not only on a wide variety of paperboard stocks, including wood vat stock, patent-coated newsback corrugated board and clay-coated board, but also on other sheet stocks including plastics such as polyethylene and foils of stainless steel and aluminum.

In a preferred procedure, the adhesive coating of this invention is melted from a slab, pellet or cylindrical form in a hot oil-jacketed reservoir using a premelter to facilitate high speed continuous throughput operation. The melt composition is pumped from the reservoir up to a multi-headed fountain above an application roll where a molten pool of melt is held between a roll and an adjustable heated doctor blade. The sheet stock is fed through nip rolls, receiving the molten adhesive from the doctored application roll at temperatures between 300° to 380° F. at levels down to ½ mil thickness. The coated, printed stock is conveyed through a multi-stage, reverse-roll burnishing section, the temperature of the rolls being about 400° F., where the coating is re-softened, shaved and smoothed, removing any air bubbles, peaks and other irregularities. The smoothly coated board then travels under a reheat section fired by gas at about 1,800° F. where the coating is completely liquified, then immediately passes under a falling curtain of refrigerated water at about 40° F., where the gloss is "frozen in." Then the highly glossed sheet stock passes through rubber squeeze rolls, where the remaining water droplets are removed, and the sheets move on to a conveyor to be stacked.

Alternatively, coating may be carried out on various kinds of extrusion coaters or curtain coaters may be used. The latter are particularly suitable for preparing cards from corrugated board for industrial packaging where extremely high gloss is not required as, for example, in packaging hardware or electronic parts for factory use.

The manufacture of plasti-pack cards by any of the aforementioned procedures eliminates operations necessary when using solvent systems such as explosion-proof machinery and solvent fume equipment. Further economies can be achieved via increased speeds of application, translation speeds of between 300 and 700 feet per minute being obtainable.

In the packaging operation involving the attachment of blister or skin to the plasti-pack card, the coated cards of the instant invention have a substantial advantage over the conventional varnish-coated cards in that the time cycle may be considerably shortened. The total time required will depend on a number of operating factors. Speed of reactivation (melting) and heat sealing will vary, depending upon whether reactivation occurs through the blister or through the card. Other factors determining the time cycle will include the temperature and pressure of heat sealing, and the thickness and material of board and blister. Manufacture of plasti-packs using the plasti-pack cards of the instant invention has been successfully carried out with heat sealing for one second with a jaw temperature at 275° F. and at 10 psi., followed by cooling for 2 seconds. This compares very favorably in contrast to the usual commercial 4 to 6 seconds cycle with 70 psi. and jaw temperature between 350° and 375° F.

The invention is further described in connection with the following specific examples of the practice of it which are set forth for the purpose of illustration only.

EXAMPLE 1

To a clean, dry kettle, equipped with a stirrer and heating jacket and heated to 300° F., there was added 22 parts by weight of a paraffin melting at 159° F. (Shellwax 300) and 5.4 parts of a paraffin melting at 183° F. (Shellwax 700). When the waxes had melted, there were added successively the following components, taking care before each successive addition that the mixture was smooth and free of polymer "fisheyes": first, as component "A" of this mix, 35 parts of an ethylene vinyl acetate copolymer with vinyl acetate content 33 percent, melt index 25, [Elvax 150]; then 0.2 parts 2,6-ditertiary butyl 4-methyl phenol [Ionol]; 0.2 parts 4,4'-methylene bis (2,6-ditertiary butyl phenol) ["Ethyl" Anti-oxidant 702]; 5 parts of an ethylene vinyl acetate copolymer containing 15 percent vinyl acetate, softening at 95° C. and having hardness 8.0 and 500 cps. viscosity at 140° C. [Wax AC-400]; 2.8 parts of an ethylene vinyl acetate copolymer (being component "B" of this mix) with 40 percent vinyl acetate and a melt index of 52 [Elvax 40]; 0.4 parts disoleoylamide [Carlisle Synthetic Wax 225]; 2.0 parts of a microcrystalline wax [Sunoco 1290Y]; 5.0 parts of a high melting (214° F.), Fischer-Tropsch synthetic paraffin with molecular weight approximately 750 [Paraflint RG]; and finally, as component "C" of this mix, 22 parts of a highly stabilized esterified rosin [Foral 85]. When the total mixture was found to be completely smooth and homogeneous, it was drawn off through a 100 mesh stainless steel screen.

A sample of this hot-melt resin product was heated in an oven to 350° F. The molten resin was applied at 7.2 lbs. per ream to bleached sulfate cylinder board, using a No. 9 Meyer wire-wound rod. When the coated board had cooled to room temperature, it was cut into strips. On top of these strips there were placed strips, .6 to 7 mils thick, of respectively cellulose acetate propionate, polystyrene and polyvinyl chloride, representing plastic types commercially used to make blisters. The plastic strips were sealed to the coated board using a Sentinel heat-seal apparatus with heated top jaw. The conditions of heat-sealing were 350° F. and 4 psi. for 2 seconds. After removal from the jaw and cooling to room temperature, the laminated samples were submitted to a 90° peel test, using a modified laboratory unit based on a Scott tensile tester operated at a rate of 2 inches per minute. Corresponding tests with quick impact were also carried out. In both cases, groups of 10 experimental test specimens showed 100 percent fiber failure. The tests were repeated after the coated board had aged for one year; again, 100 percent fiber failure was observed.

Samples of the coated board were submitted to measurements of specular gloss using a Photovolt meter. Specular gloss wax found to be 85 percent ± 10 percent as compared to only 50 percent characteristic of solvent type coatings.

EXAMPLE 2

The adhesive qualities of the hot melt resin of Example 1 were further examined, using bleached sulfate board stock coated with 7.2 lbs. per ream of the molten resin. Seals were made to a variety of commercial blister materials, as well as to other plastic films and metallic foil.

The materials tested: 0.001-inch vinyl chloride film; 0.010-inch vinyl chloride blister sheet; 0.001-inch oriented polystyrene film; 0.001-inch high-impact polystyrene film; 0.010-inch cellulose acetate propionate sheet; 0.010-inch cellulose acetate butyrate sheet; 0.010-inch cellulose acetate sheet; 195 gauge heat seal coated cellophane; 0.0010-inch polyvinylidene chloride film; 0.001-inch polyester film; Udel 0.003-inch polypropylene film; 0.001-inch polyethylene film; 0.001-inch coated polyolefin film; 0.00035-inch paper backed aluminum foil; 0.001-inch thick unsupported steel foil; 0.010-inch thick Surlyn A 1707 ionomer film.

All seals were made through the card stock using a Sentinel laboratory jaw sealer at 375° F., 4-second dwell, and under a load of 4 psi. In all cases the 90° peel test showed 100 percent fiber tear both initially and after 72 hrs.

EXAMPLE 3

The procedure of Example 1 was followed except that the Foral 85 was replaced by an equal quantity of a different stabilized esterified rosin [Foral 105]. This product was water white, had a softening range of 186°–197° F. and a viscosity at 350° F. equal to 2,300 cps. Coatings on paperboard were made as in Example 1 and seals made to to Surlyn 1707, polypropylene and cellulose acetate propionate. In all cases both 90° peel test and quick impact tear showed 100 percent fiber tear.

EXAMPLE 4

The procedure of Example 3 was followed except that the Elvax 150 was replaced by an equal amount of an ethylene vinyl acetate copolymer having vinyl acetate content 33 percent and melt index 20 [Eva 605], the Elvax 40 was replaced by an equal amount of an ethylene vinyl acetate copolymer having 40 percent vinyl acetate and melt index 9 [UE 644X], the Paraflint RG was replaced by an equal quantity of another Fischer-Tropsch synthetic paraffin with molecular weight approximately 850[Paraflint SH] and melting at 220° F., Carlisle 225 was replaced by an equal quantity of a fatty acid ester of melting range 107°–117° C.,sp.gr. 0.97 and acid value greater than 15, [Glycolube VL] and the Shellwax 300 was replaced by an additional 22 parts of Shellwax 700.

The product thus made was water-white and had softening range 202°–210° F. and viscosity at 350° F. equal to 2,900 cps. Coatings on paperboard and corresponding seals to plastic films were made as in Example 3. The seals with Surlyn 1707 and to polypropylene showed 100 percent fiber tear in both 90° peel test and quick impact test. Seals with cellulose acetate propionate showed 100 percent fiber tear in 90° peel test and 75 percent fiber tear in quick impact test.

EXAMPLE 5

The procedure of Example 4 was followed except that the Eva 605 was replaced by an equal quantity of an ethylene vinyl acetate copolymer having vinyl acetate content 31 percent and melt index 20 [UE 638X], the Foral 105 was replaced by 24.0 parts of a terpene urethane resin having a m.p. =95° C. (ARS 432) and Shellwax 700 was reduced in amount to 25.4 parts.

This product was water-white, had a softening range of 193°–203° F. and a viscosity at 350° F. equal to 5,750 cps. Coatings, seals and tear tests were made as in Example 3 and show 100 percent fiber tear in 90° peel tests on seals with Surlyn 1707, polypropylene and cellulose acetate propionate.

EXAMPLE 6

The procedure of Example 4 was followed except that the Eva 605 was replaced by an equal quantity of ethylene vinyl acetate copolymer having vinyl acetate content 30 percent and melt index equal to 1 [USI 642X], the UE 644X was replaced by an equal amount of an ethylene vinyl acetate copolymer having a vinyl acetate content 39 percent and melt index equal to 10 [USI 644X]. The water-white melt had a ball and ring softening range of 194° to 209° F., and a viscosity at 350° F. of 46,500 cps. Coatings on cylinder board were made as in Example 1 and sealed to strips of polyvinyl chloride, polystyrene and cellulose acetate propionate. In all cases the peel tests show 100 percent fiber tear.

EXAMPLE 7

A hot melt is made according to the procedure of Example 1 wherein component (a) of this invention is 30 parts of Elvax EP3623, an ethylene vinyl acetate copolymer being 33 percent vinyl acetate and a melt index of 12, component (b) is 4 parts of the above-described UE 644X and component (c) is 12 parts of above-described ARS 432 plus 12 parts above-described Foral 105, and the remaining components are 10 parts by weight of Allied Chemical's modified polyethylene AC 540; 5 parts Paraflint SH, a microcrystalline wax melting at 220° F. and of approximate molecular weight 850; 24.2 parts of Shellwax 700, a paraffin wax melting at 183° F.; 2.0 parts of Petrolite C–1035, a microcrystalline wax available from Petrolite Division, Bareco Wax Co.; 0.4 part glycolube VL; and 0.2 parts each of the antioxidants Polygard HR (Naugatuck Chemical) and Irganox No. 1010 (Geigy Industrial Chemicals).

This product was water white and had a softening range 207°–216° F. and a viscosity of 5,050 cps. at 300° F. Tests of coating and adhesion were made as in Example 1 and the following degrees of fiber tear observed:

| Plastic Sealed to Coating | % Fiber Tear | |
|---|---|---|
| | 90°Peel Test | Impact Tear |
| Surlyn 1707 | 100 | 62 |
| Polypropylene | 100 | 95 |
| Cellulose acetate propionate | 62 | 0 |

EXAMPLE 8

A hot melt was made according to the procedure of Example 7 except that 12 parts of ARS 432 were replaced by 12 parts of S–1205 which is a polyester derivative of rosin available from Hercules, Inc. This melt had a softening range of 208°–216° F. and a viscosity at 350° F. equal to 5,250 cps. Coating and adhesion tests made as in Example 1 showed 100 percent fiber tear in peel tests with Surlyn 1707 and polypropylene, 20 percent fiber tear in peel test with cellulose acetate propionate (CAP), and in the quick impace test, seals with Surlyn 1707, polypropylene and CAP showed respectively 75 percent, 78 percent, and 0 percent fiber tear.

EXAMPLE 9

A hot melt was made according to the procedure of Example 8 except that the Elvax EP 2623 was replaced by 35 parts of the aforementioned UE 638X, Foral 105 was replaced by 12 parts of ARS 432 and the AC 540 wax was replaced by 5 parts of the aforementioned AC 400. This hot melt was water-white and had a softening range of 197°–209° F. and a viscosity at 350° F. equal to 5,900 cps. Coatings and seals were made as in Example 1 to Surlyn 1707, polypropylene and cellulose acetate propionate and showed respectively in peel test 90 percent, 100 percent and 70 percent fiber tear and in quick impact tear tests respectively 80 percent, 100 percent and 65 percent tear.

EXAMPLE 10

A hot melt was made according to the procedure of Example 7 except that the Elvax EP 3623 was replaced by 25 parts of the aforementioned UE 642X, the amount of AC 540 was decreased to 12 parts and the amount of Paraflint SH was increased tc 8 parts. This water-white product had a softening range of 215°–220° F., a viscosity at 350° F. equal to 6,650 cps. and the followinG fiber tear in tests made as in Example 1.

| Plastic Sealed to Coating | % Fiber Tear 90° Peel Test | Impact Tear |
|---|---|---|
| Surlyn 1707 | 100 | 35 |
| Polypropylene | 100 | 78 |
| Cellulose Acetate Propionate | 10 | 0 |

EXAMPLE 11

Various hot melt formulations are made according to the procedure of Example 1, wherein the amounts of component (a) are varied between 25 and 45 parts by weight per 100 of total formulation, the amounts of component (b) are varied between 1 and 10 parts and the amounts of component (c) are varied between 15 and 35 parts. Component (a) is selected from ethylene vinyl acetate copolymers containing between 25 and 35 percent vinyl acetate and having melt indexes between about 1 and about 30. Component (b) is selected from ethylene vinyl acetate copolymers containing between about 35 and about 55 percent vinyl acetate and having melt indexes between about 5 and about 65. Component (c) is selected from the group consisting of Foral 85, Foral 105, ARS 432, Hercules S1205 and mixtures thereof. The remainder of the 100 parts is made up of the remaining non-critical components in Example 1 and in the same proportions as therein.

In each case a hot melt resin is obtained which is coatable on paperboard, polyethylene and metal foil, which coating adheres on heat reactivation to the materials enumerated in Example 2.

It will be understood that it is intended to cover all changes and modifications of the examples of the invention herein chosen for the purpose of illustration which do not constitute departures from the spirit and scope of the invention.

What is claimed is:

1. In a method for plasti-pack packaging of an article which method comprises applying a hot-melt coating mixture in the molten state to at least one side of a suitable rigid substrate to form a plasti-pack card and heat sealing to at least one coated side of said card a plastic envelope enclosing said article, an improvement making it possible to seal said card with a plastic envelope selectable interchangeably from the group consisting of cellulose acetate, cellulose acetate butyrate, cellulose acetate propionate, polyethylene, polypropylene, polyvinyl chloride, polyvinylidene chloride, polystyrene, steel foil and aluminum foil, said improvement consisting of using as said hot melt coating mixture a mixture comprising a. between about 25 and about 45 parts by weight of an ethylene vinyl acetate copolymer having between about 25 and about 35 percent of vinyl acetate and having a melt index between about 1 and about 30, b. between about 1 and about 10 parts of an ethylene vinyl acetate copolymer having between about 35 and 55 percent vinyl acetate and having a melt index between about 5 and 65, and c. between about 15 and about 35 parts of a tackifying resin selected from the group consisting of rosin derivatives and terpene urethanes and having a melting point between about 200° and about 240° F.

2. The improvement of claim 1 wherein the applied molten coating is allowed to solidify, the resultant plasti-pack card is stored until needed and the heat sealing is accomplished by applying heat to reactivate the coating.

3. The improvement of claim 1 wherein the plastic envelope is a blister and whereby the resultant package is a blister-pack.

4. The improvement of claim 1 wherein the plastic envelope is a skin and whereby the resultant package is a skin-pack.

5. The improvement of claim 2 wherein the plastic envelope is a blister and whereby the resultant package is a blister-pack.

6. The improvement of claim 2 wherein the plastic envelope is a skin and whereby the resultant package is a skin-pack.

7. The plasti-pack card of claim 2.

* * * * *